United States Patent
Nakamoto (10) Patent No.: US 10,035,265 B2
(45) Date of Patent: Jul. 31, 2018

(54) MANIPULATOR

(71) Applicant: KABUSHIKI KAISHA TOSHIBA, Minato-ku (JP)

(72) Inventor: Hideichi Nakamoto, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 178 days.

(21) Appl. No.: 15/265,193

(22) Filed: Sep. 14, 2016

(65) Prior Publication Data

US 2017/0182661 A1 Jun. 29, 2017

(30) Foreign Application Priority Data

Dec. 28, 2015 (JP) ................................ 2015-257037

(51) Int. Cl.
*G05B 19/18* (2006.01)
*B25J 9/16* (2006.01)
*B25J 19/00* (2006.01)

(52) U.S. Cl.
CPC ......... *B25J 9/1638* (2013.01); *B25J 19/0008* (2013.01); *Y10S 901/09* (2013.01); *Y10S 901/48* (2013.01)

(58) Field of Classification Search
CPC .. B25J 9/10; B25J 9/1643; G05B 2219/40333
See application file for complete search history.

(56) References Cited

U.S. PATENT DOCUMENTS

| 7,013,750 | B1* | 3/2006 | Kazami | B25J 9/08 74/490.03 |
| 7,441,614 | B2* | 10/2008 | Takemura | B25J 17/0283 180/8.1 |
| 2005/0222830 | A1 | 10/2005 | Massie et al. | |
| 2013/0061709 | A1* | 3/2013 | Kim | B25J 11/0015 74/490.05 |
| 2013/0338827 | A1* | 12/2013 | One | B25J 9/10 700/252 |
| 2014/0248110 | A1 | 9/2014 | Kfoury | |
| 2017/0028548 | A1* | 2/2017 | Nagano | B25J 9/10 |

FOREIGN PATENT DOCUMENTS

| JP | 09-503603 A | 4/1997 |
| JP | 2003-053684 A | 2/2003 |
| JP | 2009-291843 A | 12/2009 |
| JP | 2010-005757 A | 1/2010 |
| JP | 2014-530121 A | 11/2014 |

* cited by examiner

*Primary Examiner* — Mingjen Jen
(74) *Attorney, Agent, or Firm* — Oblon, McClelland, Maier & Neustadt, L.L.P.

(57) ABSTRACT

According to an embodiment, a manipulator includes the following elements. The first joint has a rotation axis in a first direction crossing a gravity direction. The second joint has a rotation axis in a second direction crossing the first direction. The first arm and the second arm are coupled with the second joint along a third direction crossing the second direction. The variable center-of-gravity unit coupled with the first arm. The controller controls the variable center-of-gravity unit to perform an operation for moving the first weight of the variable center-of-gravity unit in a direction crossing the rotation axis of the first joint and/or an operation for moving the second weight of the variable center-of-gravity unit in a direction crossing the rotation axis of the second joint.

5 Claims, 10 Drawing Sheets

MANIPULATOR

CROSS-REFERENCE TO RELATED APPLICATIONS

This application is based upon and claims the benefit of priority from Japanese Patent Application No. 2015-257037, filed Dec. 28, 2015, the entire contents of which are incorporated herein by reference.

FIELD

Embodiments described herein relate generally to a manipulator.

BACKGROUND

A manipulator is used for an arm of a robot in a logistics or production site to perform works for holding a load or a produced component and moving the load or the produced component to another location.

The manipulator uses a deadweight compensation mechanism capable of cancelling the weight of the manipulator itself (i.e., the deadweight) with a mechanical structure. With this deadweight compensation mechanism, a power for maintaining the static state of the manipulator can be reduced.

In a conventional design of a manipulator, a method in which a torque motor for driving a joint of a manipulator is provided at an outside of the joint or a method for using a weight to balance moments about a rotation axis of a joint of a manipulator are employed to cancel a deadweight of the manipulator. Therefore, the energy consumed by a torque motor can be reduced. Since it is not necessary to have a large torque motor, the manipulator can be reduced in size. However, there is no deadweight compensation mechanism made in view of a mass of an object held by a holder of a manipulator. It is desired to achieve a compact manipulator that includes the deadweight compensation mechanism in view of a mass of an object held.

DETAILED DESCRIPTION

According to an embodiment, a manipulator includes a base, a first joint, a first coupling member, a second joint, a second coupling member, a first arm, a second arm, a variable center-of-gravity unit, a holder, and a controller. The first joint has a rotation axis in a first direction crossing a gravity direction. The first coupling member couples the base and the first joint. The second joint has a rotation axis in a second direction crossing the first direction. The second coupling member couples the first joint and the second joint. The first arm is coupled with the second joint along a third direction crossing the second direction. The second arm is coupled with the second joint, at a side opposite to a side where the second joint is coupled with the first arm, along the third direction. The variable center-of-gravity unit is coupled with the first arm at a side opposite to a side where the first arm is coupled with the second joint, the variable center-of-gravity unit including a first weight and a second weight. The holder is coupled with the second arm at a side opposite to a side where the second arm is coupled with the second joint. The controller controls the variable center-of-gravity unit to perform at least one of operations while the holder holds an object, the operations including a first operation for moving the first weight of the variable center-of-gravity unit in a direction crossing the rotation axis of the first joint and a second operation for moving the second weight of the variable center-of-gravity unit in a direction crossing the rotation axis of the second joint.

Hereinafter, embodiments will be described with reference to the drawings. It should be noted that elements denoted with the same reference numerals are denoted with the same elements. The drawings are in a schematic or conceptual nature, and the relationship between the thickness and the width of each portion and the ratio of the sizes of the portions are not necessarily be the same as the actual relationship and the ratios. Even when the same portion is indicated, the dimensions and the ratios may be shown as different from each other depending on the drawings.

First Embodiment

Figure 1:
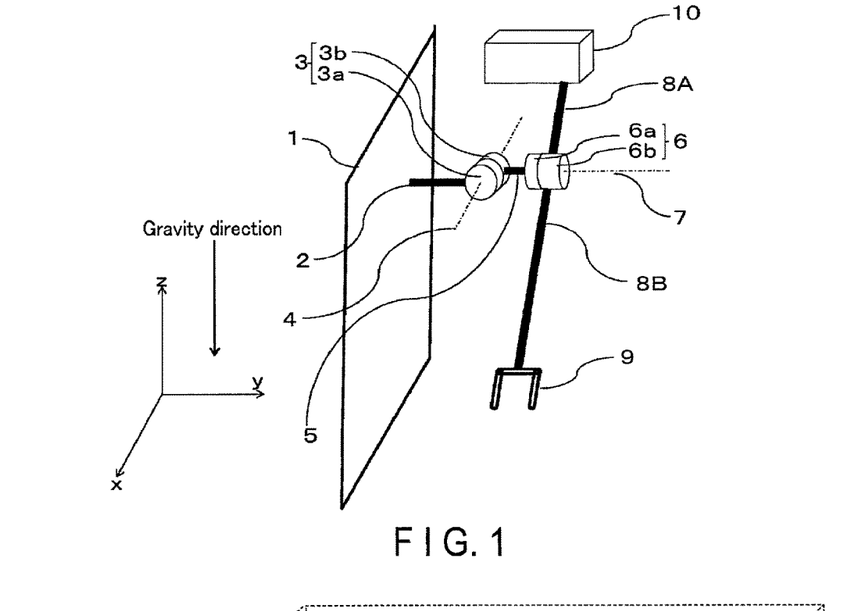
FIG. 1 is a schematic diagram illustrating a manipulator.

FIG. 1 illustrates a manipulator.

The manipulator shown in FIG. 1 includes a base 1, a connecting member (also called a first coupling member) 2, a first joint 3 having a first rotation axis 4, a first link (also called a second coupling member) 5, a second joint 6 having a second rotation axis 7, a first arm member (also called a first arm) 8A, a second arm member (also called a second arm) 8B, a holder 9 capable of holding an object, and a counterweight part (also called a variable center-of-gravity unit) 10 for maintaining a balance with the deadweight of the manipulator.

In FIG. 1, x axis, y axis, and z axis are illustrated. The negative direction of z axis corresponds to the gravity direction.

The connecting member 2 is connected to the base 1.

The first joint 3 includes a fixed part 3a and a rotating part 3b. The fixed part 3a is connected to the connecting member 2. The direction of the first rotation axis 4 of the first joint 3 is a direction crossing the gravity direction, which is also called a first direction. Since a motor is provided in the first joint 3, the rotating part 3b of the first joint 3 can rotate about the first rotation axis 4.

The second joint 6 includes a fixed part 6a and a rotating part 6b.

One end of the first link 5 is connected to the rotating part 3b of the first joint 3. The other end of the first link 5 is connected to the second joint 6. The direction of the second rotation axis 7 of the second joint 6 is a direction crossing the first direction, which is also called a second direction. Since a motor is provided in the second joint 6, the rotating part 6b of the second joint 6 can rotate about the second rotation axis 7.

Alternatively, the first joint 3 and the second joint 6 may be driven by an actuator.

The first arm member 8A is coupled with the rotating part 6b of the second joint 6 along a third direction crossing the second direction.

The second arm member 8B is coupled with the rotating part 6b of the second joint 6, at the side opposite to the side where the first arm member 8A is coupled, along the third direction. In this case, the arm is to connect a joint and another joint or member.

The counterweight part 10 is coupled with the first arm member 8A at the side opposite to the side where the first arm member 8A is coupled with the second joint. The counterweight part 10 is located in a direction crossing the gravity direction.

The holder 9 is connected to the second arm member 8B at the side opposite to the side where the second arm member 8B is coupled with the second joint 6. The holder 9 and the counterweight part 10 rotate about the second rotation axis 7. The counterweight part 10 is not in contact with the base 1.

Figure 2:
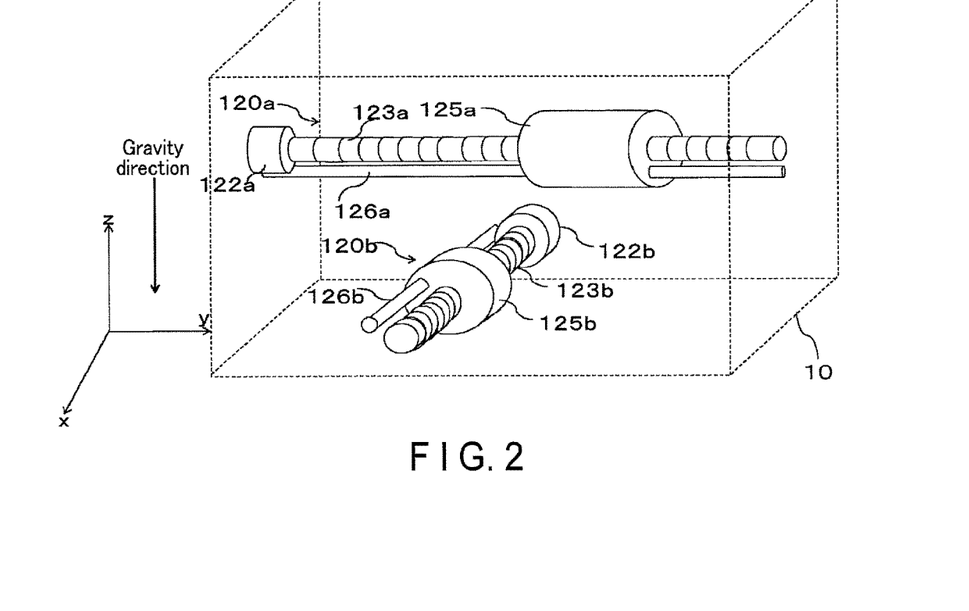
FIG. 2 is a schematic diagram illustrating an internal structure of a counterweight part.

FIG. 2 is a schematic diagram illustrating an internal structure of the counterweight part 10.

A weight moving device 120a and a weight moving device 120b are provided in the counterweight part 10. The weight moving device 120a includes a motor 122a, a screw 123a, a first weight 125a, and a guide 126a. The weight moving device 120b includes a motor 122a, a screw 123a, and a second weight 125b. The weight moving device 120a is arranged in a direction crossing the first rotation axis 4 of the first joint 3.

The weight moving device 120b is arranged in a direction crossing the second rotation axis 7 of the second joint 6. Each of the weight moving device 120a and the weight moving device 120b is fixed to the internal surface of the counterweight part 10.

In the weight moving device 120a, the screw 123a is connected to the motor 122a. Rotating the motor 122a allows the screw 123a to rotate. The first weight 125a is provided on the screw 123a. The supporting member 126a is disposed along the screw 123a and is fixed to the internal surface of the counterweight part 10. The supporting member 126a penetrates through the first weight 125a, and therefore, the first weight 125a does not rotate about the screw 123.

When the motor 122a rotates, the screw 123a rotates, and therefore, the first weight 125a can move along the screw 123a and the supporting member 126a. The weight moving device 120a arranged in a direction crossing the first rotation axis 4 can move the first weight 125a in the direction crossing the first rotation axis 4.

The weight moving device 120b has the same structure as the weight moving device 120a. The weight moving device 120b arranged in the direction crossing the second rotation axis 7 can move the second weight 125b in the direction crossing the second rotation axis 7.

When the positions of the first weight 125a and the second weight 125b are changed inside of the counterweight part 10, the position of the center of gravity of the counterweight part 10 can be changed.

After the positions of the first weight 125a and the second weight 125b are changed to change the position of the center of gravity of the counterweight part 10, the motor of the first joint 3 and the motor of the second joint 6 are driven, so that the holder 9 holds the object.

The position where the weight moving device 120a is fixed in the counterweight part 10 may be anywhere, as long as the first weight 125a of the weight moving device 120a can move in the second direction. The position where the weight moving device 120b is fixed in the counterweight part 10 may be anywhere, as long as the first weight 125b of the weight moving device 120b can move in the third direction.

Figure 3A:
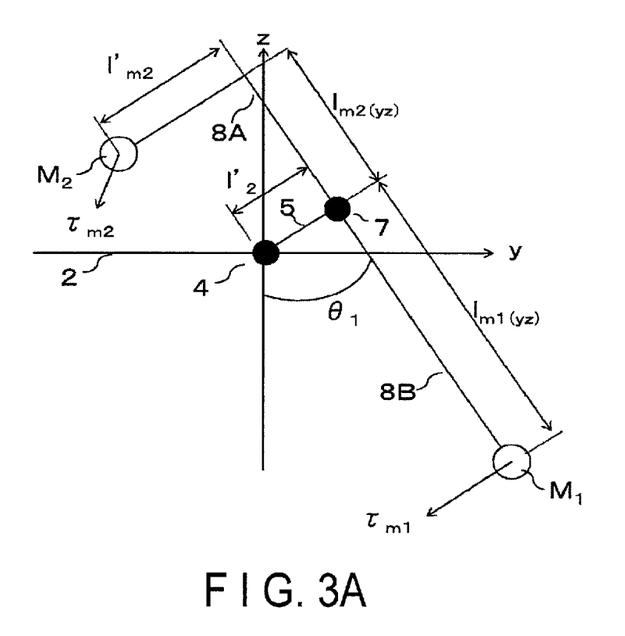
FIG. 3A is a model diagram which is seen from a first rotation axis.
Figure 3B:
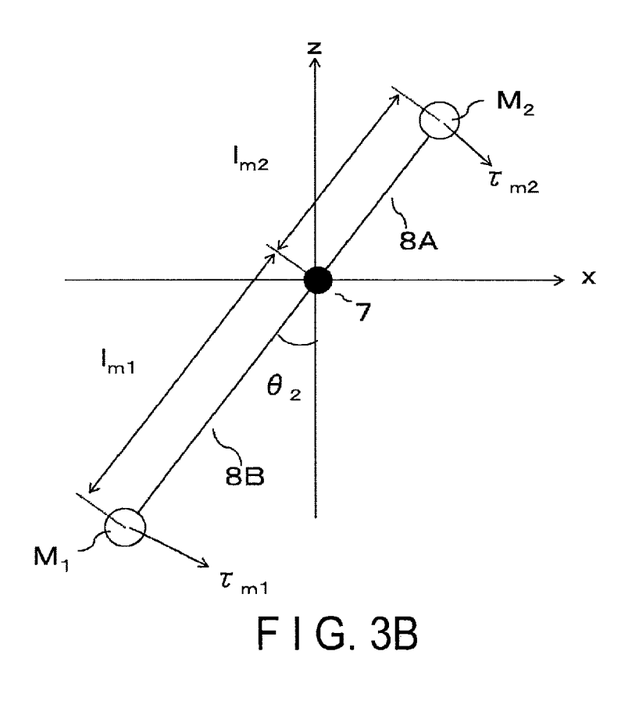
FIG. 3B is a model diagram which is seen from a second rotation axis.

FIG. 3A is a model diagram illustrating a manipulator which is seen from the direction of the first rotation axis 4 of the first joint 3. FIG. 3B is a model diagram illustrating a manipulator which is seen from the direction of the second rotation axis 7 of the second joint 6.

A case where the holder 9 of the manipulator is not holding any object will be considered.

In FIG. 3A, the horizontal axis is y axis, the vertical axis is z axis, and the first rotation axis 4 of the first joint 3 is in the origin.

Let $M_1$ be a total mass of the second arm member 8B and the holder 9. Point $M_1$ shown in FIG. 3A, etc. indicates the center of gravity of the second arm member 8B and the holder 9.

Let $M_2$ be a total mass of the first arm member 8A, the rotating part 6b of the second joint 6, and the counterweight part 10. Point $M_2$ shown in FIG. 3A, etc. indicates the center of gravity of the first arm member 8A, the rotating part 6b of the second joint 6, and the counterweight part 10.

Let $l'_2$ be a length between the first rotation axis 4 and the second rotation axis 5, and let $l'_{m2}$ be and a length between the first arm member 8A and the point $M_2$.

Let $l_{m1(yz)}$ be a length between the second rotation axis 7 and the point $M_1$, projected on yz plane, and let $l_{m2(yz)}$ be a length between a cross point of $l'_{m2}$ and the arm member 8A and the second rotation axis 7, projected on yz plane.

Let $\theta_1$ be an angle between z axis and the second arm member 8B.

In FIG. 3B, the horizontal axis is x axis, the vertical axis is z axis, and the second rotation axis 7 of the second joint 6 is in the origin.

Let $l_{m1}$ be a length between the second rotation axis 7 and the point $M_1$, and let $l_{m2}$ be a length between the second rotation axis 7 and the point $M_2$.

Let $\theta_2$ be an angle between z axis and the second arm member 8B.

In FIG. 3A, $l_{m1(yz)}$ and $l_{m2(yz)}$ are expressed by expressions (1) and (2).

$$l_{m1(yz)}=l_{m1}\cos\theta_2 \tag{1}$$

$$l_{m2(yz)}=l_{m2}\cos\theta_2 \tag{2}$$

Let $\tau_{m1}$ and $\tau_{m2}$ be moments about the first rotation axis 4 caused by the point $M_1$ and the point $M_2$, respectively. $\tau_{m1}$ and $\tau_{m2}$ are expressed by expressions (3) and (4).

$$\tau_{m1}=(l_{m1(yz)}\sin\theta_1+l'_2\cos\theta_1)M_1g \tag{3}$$

$$\tau_{m2}=\{l_{m2(yz)}\sin\theta_1+(l'_{m2}-l'_2)\cos\theta_1\}M_2g \tag{4}$$

When the balance of the moments about the first rotation axis 4 is maintained, the expression (5) is satisfied.

$$\tau_{m1}=\tau_{m2} \tag{5}$$

By substituting the expressions (1) to (4) explained above into the expression (5), the following expression (6) is obtained.

$$(l_{m1}M_1-l_{m2}M_2)g\sin\theta_1\cos\theta_1+\{l'_2M_1-(l'_{m2}-l'_2)M_2\}g\cos\theta_1=0 \tag{6}$$

In order to satisfy the expression (6) regardless of the angle $\theta_1$ and the angle $\theta_2$, the expressions (7) and (8) may be satisfied.

$$l_{m1}M_1=l_{m2}M_2 \tag{7}$$

$$l'_2M_1=(l'_{m2}-l'_2)M_2 \tag{8}$$

In FIG. 3B, the moment $\tau_{m1}$ of the point $M_1$ about the second rotation axis 7 and the moment $\tau_{m2}$ of the point $M_2$ about the second rotation axis 7 are expressed by expressions (9) and (10).

$$\tau_{m1}=l_{m1}M_1\sin\theta_2\cdot g\cos\theta_1 \tag{9}$$

$$\tau_{m2}=l_{m2}M_2\sin\theta_2\cdot g\cos\theta_1 \tag{10}$$

When the balance of the moments about the second rotation axis 7 is maintained, the expression (11) holds.

$$\tau_{m1}=\tau_{m2} \tag{11}$$

By substituting the expressions (9) to (10) explained above into the expression (11), the following expression (12) is obtained.

$$l_{m1}M_1=l_{m2}M_2 \tag{12}$$

The expression (7) and the expression (12) are the same. When the dimensions and masses of the components forming the manipulator are designed to satisfy the expressions (13) and (14), the balance of the moments about the first rotation axis 4 is maintained, and further, the balance of the moments about the second rotation axis 7 is maintained regardless of the angle $\theta_1$ and the angle $\theta_2$. Therefore, the force for driving the first joint 3 and the second joint 6 can be suppressed. Therefore, the motor of the actuator required for driving the first joint 3 and the second joint 6 can be reduced in size, and the actuator itself can be reduced in size. It is sufficient that the expressions (13) and (14) are approximately satisfied.

$$l_{m1}M_1=l_{m2}M_2 \tag{13}$$

$$l'_2M_1=(l'_{m2}-l'_2)M_2 \tag{14}$$

Figure 4A:
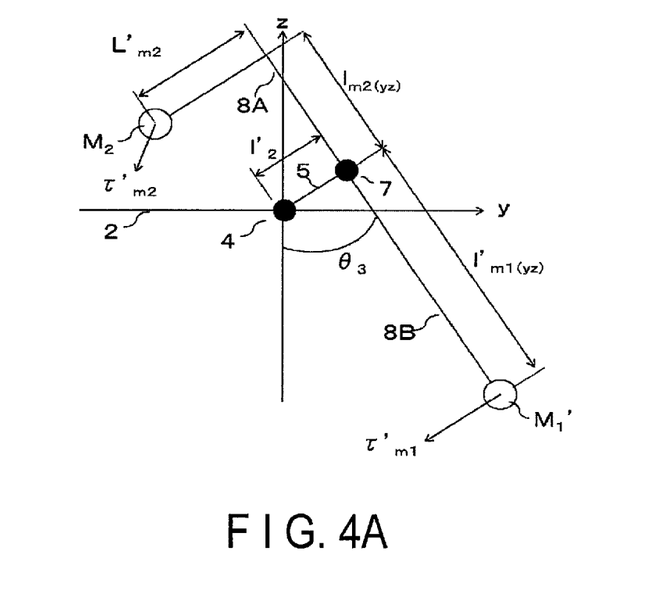
FIG. 4A is a model diagram which is seen from the first rotation axis.
Figure 4B:
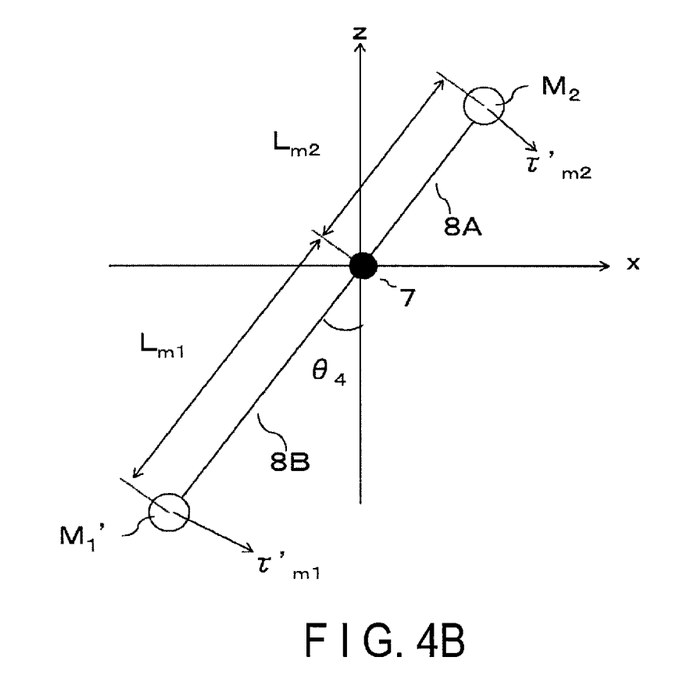
FIG. 4B is a model diagram which is seen from the second rotation axis.

FIG. 4A is a model diagram illustrating a manipulator which is seen from the direction of the first rotation axis 4 of the first joint 3. FIG. 4B is a model diagram illustrating a manipulator which is seen from the direction of the second rotation axis 7 of the second joint 6.

A case where the holder 9 holds an object will be considered. In FIG. 4A, the same portions as FIG. 3A are denoted with the same reference numerals, and explanation thereabout is omitted. In FIG. 4B, the same portions as FIG. 3B are denoted with the same reference numerals, and explanation thereabout is omitted.

In FIG. 4A, point $M'_1$ indicates a center of gravity of the second arm member 8B, the holder 9, and the held object when the holder 9 is holding an object. Let $M'_1$ be a total mass of the second arm member 8B, the holder 9, and the held object when the holder 9 is holding an object. Let $l'_{m1(yz)}$ be a length between the second rotation axis 7 and the point $M'_1$, projected on yz plane. Let $\theta_3$ be an angle between z axis and the second arm member 8B.

When the holder 9 holds an object, the weight moving device 120a and the weight moving device 120b in the counterweight 10 are driven.

The first weight 125a of the weight moving device 120a is moved in the second direction, so that the length between the point $M_2$ and the first arm member 8A is increased.

At this occasion, the length between the first arm member 8A and the point $M_2$ of FIG. 4A is $L'_{m2}$, and the balance of the moments about the first rotation axis 4 can be maintained.

In FIG. 4B, let $L_{m1}$ be a length between the second rotation axis 7 and the point $M'_1$, and let $\theta_4$ be an angle between z axis and the second arm member 8B.

The second weight 125b of the weight moving device 120b is moved in the third direction, so that the length between the point $M_2$ and the second rotation axis 7 is increased. At this occasion, the length between the second rotation axis 7 and the point $M_2$ of FIG. 4B is $L_{m2}$, and the balance of the moments about the second rotation axis 7 can be maintained.

In FIG. 4A and FIG. 4B, let $\tau'_{m1}$ be the moment given to the point $M'_1$, and let $\tau'_{m2}$ be the moment given to the point $M_2$.

When the holder 9 holds an object, the weight moving device 120a and the weight moving device 120b in the counterweight 10 are driven, so that the expressions (13)' and (14)' are satisfied. Like the case where the holder 9 is not holding any object, the force for driving the first joint 3 and the second joint 6 can be suppressed. It is sufficient that the expressions (13)' and (14)' are approximately satisfied.

$$L_{m1}M'_1=L_{m2}M_2 \tag{13)'}$$

$$L'_2M'_1=(L'_{m2}-L'_2)M_2 \tag{14)'}$$

Second Embodiment

Figure 5:
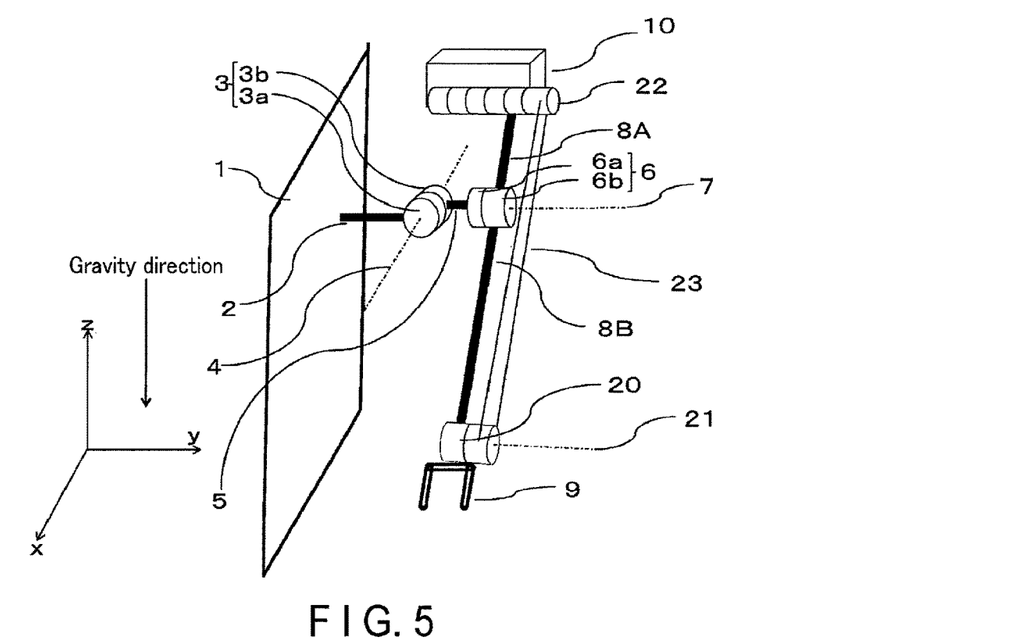
FIG. 5 is a schematic diagram illustrating a manipulator including a third joint.

FIG. 5 illustrates a manipulator including a third joint 20 and a third-joint actuator 22.

The third joint 20 is connected between the second arm member 8B and the holder 9. The third joint 20 can rotate about the third rotation axis 21. The third-joint actuator 22 that drives the third joint 20 is connected to the first arm member 8A. The third-joint actuator 22 drives the third joint 20 via the wire 23. By arranging the third joint 20, the position of the holder 9 can be changed. The third-joint actuator 22 as well as the counterweight part 10 serve as a weight. The third-joint actuator 22 is not in contact with the body 1 of the robot.

In the manipulator of FIG. 5, a case where the holder 9 is not holding any object will be considered.

In the present embodiment, the point $M_1$ shown in FIG. 3A and FIG. 3B indicates a center of gravity of the second arm member 8B, the third joint 20, and the holder 9, and $M_1$ is defined as a mass of the point $M_1$, i.e., a total mass of the second arm member 8B, the third joint 20, and the holder 9. The point $M_2$ shown in FIG. 3A and FIG. 3B indicates a center of gravity of the first arm member 8A, the rotating part 6b of the second rotation axis 6, the counterweight part 10, and the third-joint actuator 22, and $M_2$ is defined as a mass of the point $M_2$.

When the dimensions and masses of the components forming the manipulator of FIG. 5 are designed to satisfy the expressions (13) and (14), the moments about the first rotation axis 4 and the moments about the second rotation axis 7 are balanced regardless of the angle $\theta_1$ and the angle $\theta_2$. Therefore, the force for driving the first joint 3 and the second joint 6 can be suppressed. Therefore, the motor of the actuator required for driving the first joint 3 and the second joint 6 can be reduced in size, and the actuator itself can be reduced in size. It is sufficient that the expressions (13) and (14) are approximately satisfied.

In the manipulator of FIG. 5, a case where the holder 9 is holding an object will be considered.

In the present embodiment, the point $M'_1$ shown in FIG. 4A and FIG. 4B indicates a center of gravity of the second arm member 8B, the holder 9, the third joint 20, and the held object, and $M'_1$ is defined as a mass of the point $M'_1$.

Like the manipulator as illustrated in FIG. 1, the weight moving device 120a and the weight moving device 120b in the counterweight 10 are driven, so that the expressions (13)' and (14)' are satisfied. Even in a case where the holder 9 is holding an object, the force for driving the first joint 3 and the second joint 6 can be suppressed. It is efficient that the expressions (13)' and (14)' are approximately satisfied.

Modification of Second Embodiment

Figure 6:
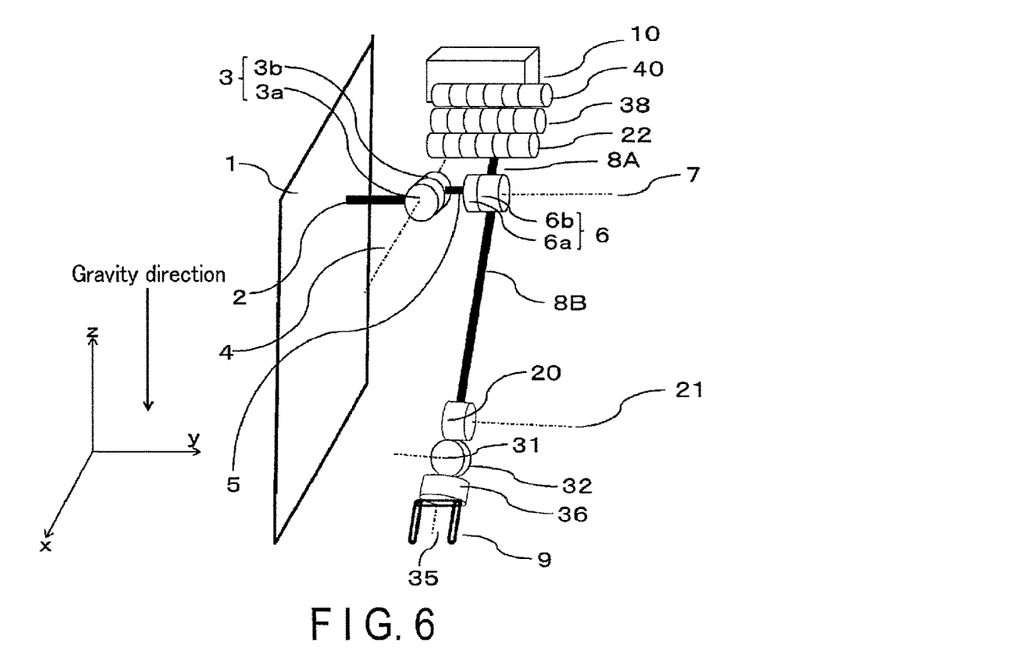
FIG. 6 is a schematic diagram illustrating a manipulator including a third joint, a fourth joint, and a fifth joint.

FIG. 6 illustrates a manipulator including three joints between the second arm member 8B and the holder 9.

A third joint 20 rotatable about a third rotation axis 21, a fourth joint 32 rotatable about a fourth rotation axis 31, and a fifth joint 36 rotatable about a fifth rotation axis 35 are connected, in the order from the side of the second arm member 8B to the side of the holder 9, between the second arm member 8B and the holder 9.

The direction of the fourth rotation axis 31 of the fourth joint 32 is in the direction crossing the third rotation axis 21 of the third joint 20. The direction of the fifth rotation axis 35 of the fifth joint 36 is a direction crossing the direction of the third rotation axis 21 of the third joint 20 and the direction of the fourth rotation axis 31 of the fourth joint 32.

A third-joint actuator 22, a fourth-joint actuator 38, and a fifth-joint actuator 40 are provided on the first arm member 8A and between the second joint 6 and the counterweight part 10. The third-joint actuator 22, the fourth-joint actuator 38, and the fifth-joint actuator 40 are arranged in the order from the side of the second joint 6 to the side of the counterweight part 10.

The fourth-joint actuator 38 drives the fourth joint 32 via a wire, but in FIG. 6 the wire is not shown. The fifth-joint actuator 40 drives the fifth joint 36 via a wire, but in FIG. 6 the wire is not shown. The third-joint actuator 22, the fourth-joint actuator 38, and the fifth-joint actuator 40 serves as a weight together with the counterweight part 10. The fourth-joint actuator 38 is not in contact with the body 1 of the robot. The fifth-joint actuator 40 is not in contact with the body 1 of the robot.

In the manipulator of FIG. 6, a case where the holder 9 is not holding any object will be considered.

In the modification of the second embodiment, the point $M_1$ shown in FIG. 3A and FIG. 3B indicates a center of gravity of the second arm member 8B, the third joint 20, the fourth joint 32, the fifth joint 36, and the holder 9, and $M_1$ is defined as a mass of the point $M_1$. The point $M_2$ indicates a center of gravity of the first arm member 8A, the rotating part 6b of the second joint 6, the counterweight part 10, the third-joint actuator 22, the fourth-joint actuator 38, and the fifth-joint actuator 40, and $M_2$ is defined as a mass of the point $M_2$.

When the dimensions and masses of components forming the manipulator of FIG. 6 are designed to satisfy the expressions (13) and (14), the moments about the first rotation axis 4 and the moments about the second rotation axis 7 are balanced regardless of the angle $\theta_1$ and the angle $\theta_2$. Therefore, the force for driving the first joint 3 and the second joint 6 can be suppressed. Therefore, the motor of the actuator required for driving the first joint 3 and the second joint 6 can be reduced in size, and the actuator itself can be reduced in size. It is sufficient that the expressions (13) and (14) are approximately satisfied.

In the manipulator of FIG. 6, a case where the holder 9 is holding an object will be considered.

In the modification of the second embodiment, the point $M'_1$ indicates a center of gravity of the second arm member 8B, the holder 9, the third joint 20, the fourth joint 32, the fifth joint 36, and the held object when the holder 9 is holding an object, and $M'_1$ is defined as a mass of the point $M'_1$.

Like the manipulator as illustrated in FIG. 1, the weight moving device 120a and the weight moving device 120b in the counterweight 10 are driven, so that the expressions (13)' and (14)' are satisfied. Just like the case where the holder 9 is not holding any object, the force for driving the first joint 3 and the second joint 6 can be suppressed. It is sufficient that the expressions (13)' and (14)' are approximately satisfied.

Figure 7:
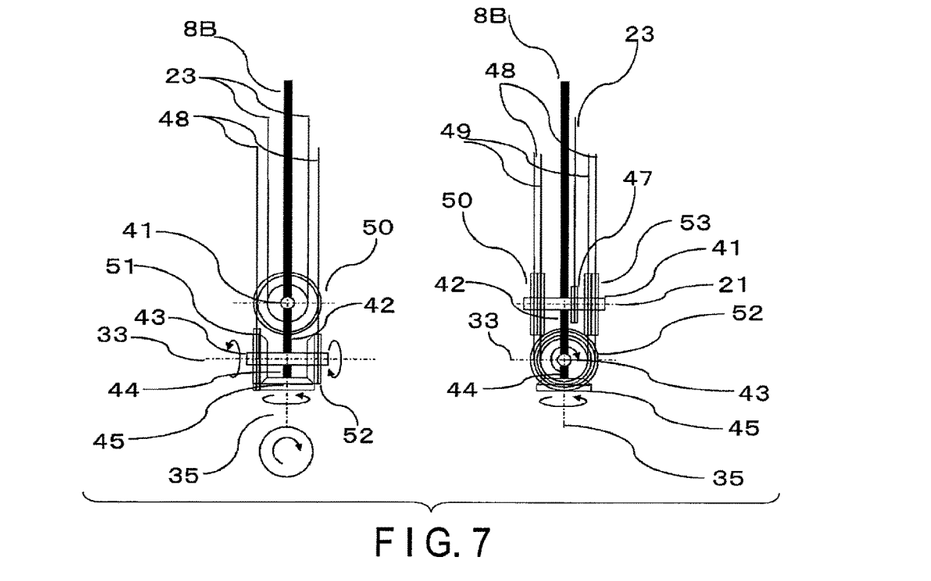
FIG. 7 is an enlarged view illustrating the third joint, the fourth joint, and the fifth joint.

The left drawing in FIG. 7 is a figure illustrating a structure of the third joint 20, the fourth joint 32, and the fifth joint 36 when they are seen in the direction of the third rotation axis 21. The right drawing in FIG. 7 is a figure illustrating a structure of the third joint 20, the fourth joint 32, and the fifth joint 36 when they are seen in the direction of the fourth rotation axis 31.

The third joint 20 includes a relay pulley 50, a relay pulley 53, a first axis member 41 at the center of the third joint 20, and a first axis pulley 47 fixed and connected to the first axis member 41.

The fourth joint 32 includes a pulley 51, a pulley 52, and a second axis member 43 at the center of the fourth joint 32. The fifth joint 36 includes a third axis member 45 at the center of the fifth joint 36.

As shown in the left drawing of FIG. 7, the second arm member 8B is connected to, in the order from the side of the second arm member 8B, the first axis member 41 at the center of the third joint 20, the first link member 42, the second axis member 43 at the center of the fourth joint 32, the second link member 44, and the third axis member 45 at the center of the fifth joint 36.

The first axis member 41 is connected to be able to rotate about the third rotation axis 21. The second axis member 43 is connected to be able to rotate about the fourth rotation axis 31. The third axis member 45 is connected to be able to rotate about the fifth rotation axis 35.

In the right drawing of FIG. 7, one end of the wire 23 is connected to the first axis pulley 47 fixed and connected to the first axis member 41, and the other end of the wire 23 is connected to the third-joint actuator 22 as illustrated in FIG. 3. The third-joint actuator 22 drives the third joint 20 via the wire 23.

As shown in the left drawing of FIG. 7, one end of the wire 48 is connected to the pulley 51, and via the relay pulley 50 connected to the first axis member 41, the other end of the wire 48 is connected to the fourth-joint actuator 38 as illustrated in FIG. 6.

As shown in the right drawing of FIG. 7, one end of the wire 49 is connected to the pulley 52, and via the relay pulley 50 connected to the first axis member 41, the other end of the wire 49 is connected to the fifth-joint actuator 40 as illustrated in FIG. 6.

As shown in the left drawing of FIG. 7, the pulley 51 and the pulley 52 transmit a force to the third axis member 45 with bevel gears. By moving the wire 48 and the wire 49, the fourth joint 32 and the fifth joint 36 can be driven. When the pulley 51 and the pulley 52 are rotated in directions opposite to each other, the third axis member 45 rotates in a clockwise direction or in a counterclockwise direction.

Figure 8:
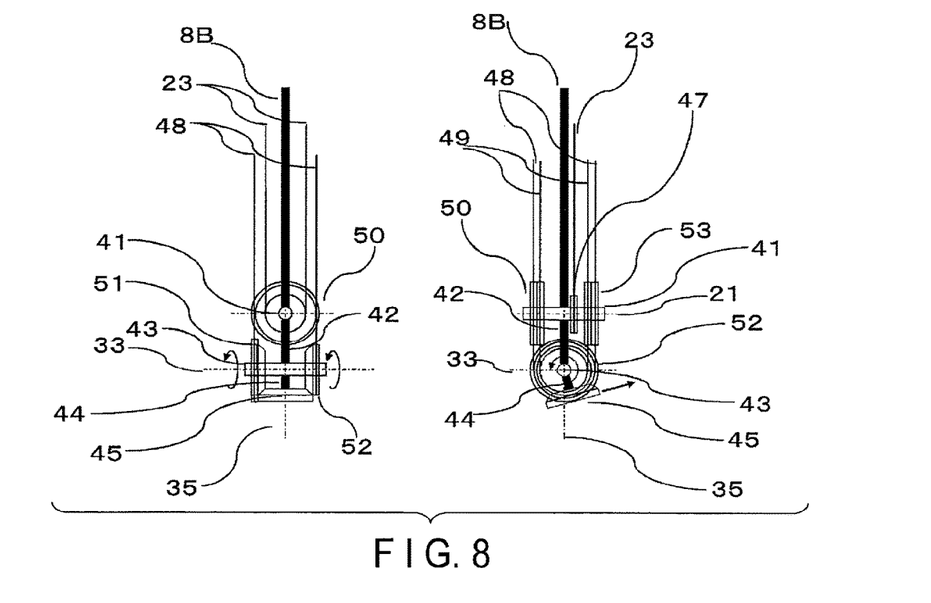
FIG. 8 is an enlarged view illustrating the third joint, the fourth joint, and the fifth joint.

As shown in the left drawing in FIG. 8, when the pulley 51 and the pulley 52 are rotated in the same direction as each other, the entire third axis member 45, which corresponds to a wrist, can be moved as shown in the right drawing of FIG. 8.

Since the manipulator includes the third joint 20, the fourth joint 32, and the fifth joint 36, the holder 9 can perform various holding works in any given posture.

Third Embodiment

Figure 9:
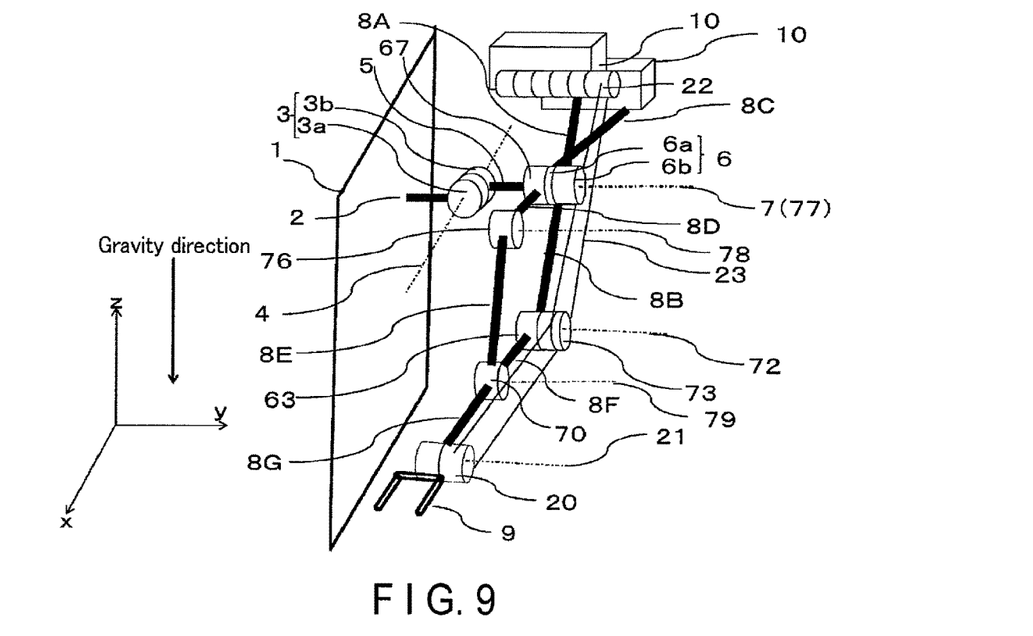
FIG. 9 is a schematic diagram illustrating a manipulator including a sixth joint and a seventh joint.

FIG. 9 illustrates a manipulator obtained by providing a fourth joint 67, a fifth joint 76, a sixth joint 63, and a seventh joint 70 to the manipulator of FIG. 5. The same portions as those of FIG. 5 are denoted with the same reference numerals, and explanation thereabout is omitted.

The fourth joint 67 rotatable about the fourth rotation axis 77 is connected to the first link 5. The fourth rotation axis 77 of the fourth joint 67 is in parallel with the second rotation axis 7 of the second joint 6.

The fourth joint 67 is connected to a third arm member 8C and a fourth arm member 8D in such a manner that the fourth joint 67 is interposed therebetween.

The third arm member 8C is connected to a counterweight part 10.

The fourth arm member 8D is connected to the fifth joint 76 rotatable about the fifth rotation axis 78. The fifth rotation axis 78 of the fifth joint 76 is in a direction in parallel with or crossing the second rotation axis 7 of the second joint 6.

The fifth joint 76 is connected to the fifth arm member 8E. The fifth arm member 8E is connected to the seventh joint 70 rotatable about the seventh rotation axis 79. The seventh rotation axis 79 of the seventh joint 70 is in a direction in parallel with or crossing the second rotation axis 7 of the second joint 6.

The second arm member 8B is connected to the sixth joint 63 rotatable about the sixth rotation axis 72. The sixth rotation axis 72 of the sixth joint 63 is in a direction in parallel with or crossing the second rotation axis 7 of the second joint 6.

The sixth joint 63 is connected to the sixth arm member 8F. The sixth arm member 8F is connected to the seventh joint 70 rotatable about the seventh rotation axis 79. The seventh rotation axis 79 of the seventh joint 70 is in a direction in parallel with or crossing the second rotation axis 7 of the second joint 6.

The seventh joint 70 is connected to the seventh arm member 8G. The third joint 20 and the holder 9 are connected, in this order, to the seventh arm member 8G.

One end of the wire 23 is connected to the third-joint actuator 22. The other end of the wire 23 is connected to the third joint 20 via the pulley 73 rotatable about the sixth joint rotation axis 72. The counterweight part 10 connected to the third arm member 8C is not in contact with the body 1 of the robot.

When the sixth joint 67 is driven, the seventh joint 63 can be driven by a link mechanism. The movable range of the holder 9 can be expanded, and various works can be performed.

Figure 10A:
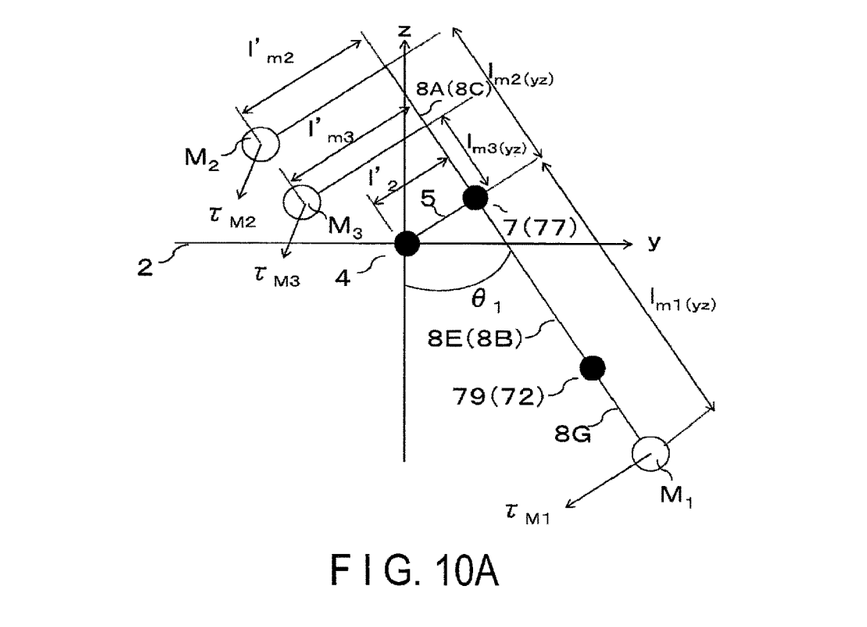
FIG. 10A is a model diagram which is seen from the first rotation axis.
Figure 10B:
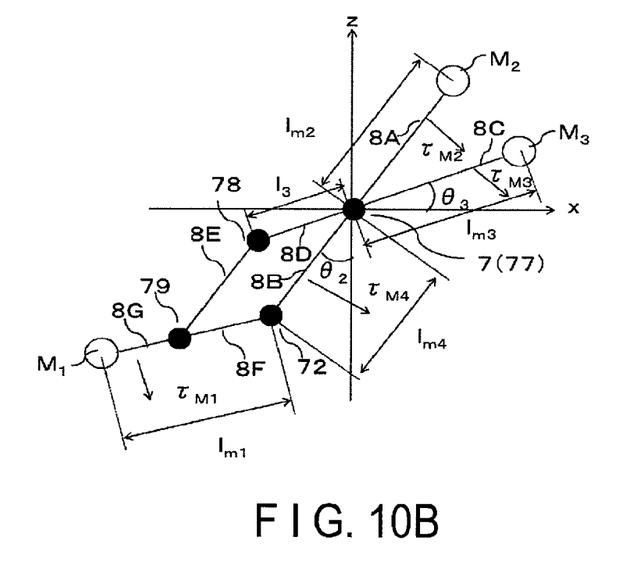
FIG. 10B is a model diagram which is seen from the second rotation axis.

FIG. 10A is a model diagram illustrating a manipulator which is seen from the direction of the first rotation axis 4 of the first joint 3. FIG. 10B is a model diagram illustrating a manipulator which is seen from the direction of the second rotation axis 7 of the second joint 6. The same portions as those in FIG. 3A and FIG. 3B are denoted with the same reference numerals, and explanation thereabout is omitted.

A case where the holder 9 of the manipulator of FIG. 9 is not holding any object will be considered.

In FIG. 10A, point $M_1$ indicates a center of gravity of the fourth arm member 8G, the third joint 20, the sixth joint 63, the sixth arm member 8F, the seventh joint 70, and the holder 9, and $M_1$ is defined as a mass of the point $M_1$. Point $M_2$ indicates a center of gravity of the first arm member 8A, the second arm member 8B, the rotating part 6b of the second joint 6, the counterweight part 10, and the third-joint actuator 22, and $M_2$ is defined as a mass of the point $M_2$. Point $M_3$ indicates a center of gravity of the third arm member 8C, the fourth arm member 8D, the fourth joint 67, the fifth joint 76, and the counterweight part 10, and $M_3$ is defined as a mass of the point $M_3$. The fifth arm member 8E and the pulley 73 have extremely lighter than the other components, and therefore, the mass thereof is considered to be zero.

Let $l'_{m3}$ be a length from the point $M_3$ to the third arm member 8C. Let $l_{m3(yz)}$ be a length between the second rotation axis 7 and a cross point of $l'_{m3}$ and the arm member 8A, projected on yz plane.

Let $\theta_1$ be the angle between z axis and the second arm member 8B.

In FIG. 10B, let $l_{m4}$ be a length between the second rotation axis 7 and the sixth rotation axis 72. Let $l_{m3}$ be a length between the second rotation axis 7 and the point $M_3$. Let $l_3$ be a length between the second rotation axis 7 and the fifth rotation axis 78. Let $l_{m2}$ be a length between the second rotation axis 7 and the point $M_2$. Let $l_{m1}$ be a length from the seventh rotation axis 72 to the point $M_1$.

Let $\theta_2$ be an angle between z axis and the second arm member 8B. Let $\theta_3$ be an angle between x axis and the third arm member 8C.

In FIG. 10A, $l_{m1(yz)}$, $l_{m2(yz)}$, and $l_{m3(yz)}$ are expressed as the expressions (15), (16), and (17).

$$l_{m1(yz)} = l_{m4} \cos \theta_2 + \sin \theta_3 \quad (15)$$

$$l_{m2(yz)} = l_{m2} \cos \theta_2 \quad (16)$$

$$l_{m3(yz)} = l_{m3} \cos \theta_3 \quad (17)$$

Let $\tau_{M1}$, $\tau_{M2}$, and $\tau_{M3}$ be the moments about the first rotation axis 4 caused by the point $M_1$, the point $M_2$, and the point $M_3$, respectively. $\tau_{M1}$, $\tau_{M2}$, and $\tau_{M3}$ are expressed by the expressions (18), (19), and (20), respectively.

$$\tau_{M1} = \{l_{m1(yz)} \sin \theta_1 + l'_2 \cos \theta_1\} M_1 g \quad (18)$$

$$\tau_{M2} = \{l_{m2(yz)} \sin \theta_1 + (l'_{m2} - l'_2) \cos \theta_1\} M_2 g \quad (19)$$

$$\tau_{M3} = \{l_{m3(yz)} \sin \theta_1 + (l'_{m3} - l'_2) \cos \theta_1\} M_3 g \quad (20)$$

When the balance of the moments about the first rotation axis 4 is maintained, the expression (21) is satisfied.

$$\tau_{M2} + \tau_{M3} = \tau_{M1} \qquad (21)$$

By substituting the expressions (15) to (20) explained above into the expression (21), the following expression (22) is obtained.

$$\{(l_{m2}M_2 - l_{m4}M_1)\cos\theta_2 + (l_{m3}M_3 - l_{m1}M_1)\sin\theta_3\}\sin\theta_1 + \{(l'_{m2} - l'_2)M_2 + (l'_{m3} - l'_2)M_3 - l'_2M_1\}\cos\theta_1 = 0 \qquad (22)$$

In order to satisfy the expression (22) regardless of the angle $\theta_1$, the angle $\theta_2$, and the angle $\theta_3$, the expressions (23), (24) and (25) may be satisfied.

$$l_{m2}M_2 = l_{m4}M_1 \qquad (23)$$

$$l_{m3}M_3 = l_{m1}M_1 \qquad (24)$$

$$(l'_{m2} - l'_2)M_2 + (l'_{m3} - l'_2)M_3 = l'_2M_1 \qquad (25)$$

In FIG. 10B, let $\tau_{M1}$ be a moment of a portion of the length $l_{m1}$ between the seventh rotation axis 72 and the point $M_1$. The moment $\tau_{M1}$ is exerted in the direction of the angle $\theta_3$. Let $\tau_{M4}$ be a moment of a portion of the length $l_{M4}$ between the second rotation axis 7 and the seventh rotation axis 72. The moment $\tau_{M4}$ is exerted in the direction of the angle $\theta_2$. Let $\tau_{M2}$ be a moment of a portion of the length $l_{m2}$ between the second rotation axis 7 and the point $M_2$. The moment $\tau_{M2}$ is exerted in the direction of the angle $\theta_2$. Let $\tau_{M3}$ be a moment of a portion of the length $l_{m3}$ between the second rotation axis 7 and the point $M_3$. The moment $\tau_{M3}$ is exerted in the direction of the angle $\theta_3$.

The moments $\tau_{M1}, \tau_{M2}, \tau_{M3}$, and $\tau_{M4}$ are expressed by the expressions (26), (27), (28), and (29).

$$\tau_{M1} = \{l_{m4}\sin\theta_2 + l_{m1}\sin(\theta_2 + \theta_3)\}M_1 g \qquad (26)$$

$$\tau_{M2} = l_{m2}M_2 \sin\theta_2 \cdot g \cos\theta_1 \qquad (27)$$

$$\tau_{M3} = l_{m3}M_3 \sin\theta_3 \cdot g \cos\theta_1 \qquad (28)$$

$$\tau_{M4} = l_{m4}M_1 \sin\theta_2 \cdot g \cos\theta_1 \qquad (29)$$

When the balance of the moments about the second rotation axis 7 is maintained, the expressions (30) and (31) are satisfied.

$$\tau_{M2} = \tau_{M4} \qquad (30)$$

$$\tau_{M3} = \tau_{M1} \qquad (31)$$

By substituting the expressions (26) to (29) explained above into the expressions (30) and (31), the following expressions (32) and (33) is obtained.

$$l_{m2}M_2 = l_{m4}M_1 \qquad (32)$$

$$l_{m3}M_3 = l_{m1}M_1 \qquad (33)$$

The expression (23) and the expression (32) are the same. The expression (24) and the expression (33) are the same expression.

When the dimensions and masses of components forming the manipulator are designed to satisfy the expressions (34), (35), and (36), the moments about the first rotation axis 4 and the moments about the second rotation axis 7 are balanced regardless of the angle $\theta_1$, the angle $\theta_2$, and the angle $\theta_3$. Therefore, the force for driving the first joint 3 and the second joint 6 can be suppressed. Therefore, the motor of the actuator required for driving the first joint 3 and the second joint 6 can be reduced in size, and the actuator itself can be reduced in size. It is sufficient that the expressions (34), (35), and (36) are approximately satisfied.

$$l_{m2}M_2 = l_{m4}M_1 \qquad (34)$$

$$l_{m3}M_3 = l_{m1}M_1 \qquad (35)$$

$$(l'_{m2} - l'_2)M_2 + (l'_{m3} - l'_2)M_3 = l'_2M_1 \qquad (36)$$

Figure 11A:
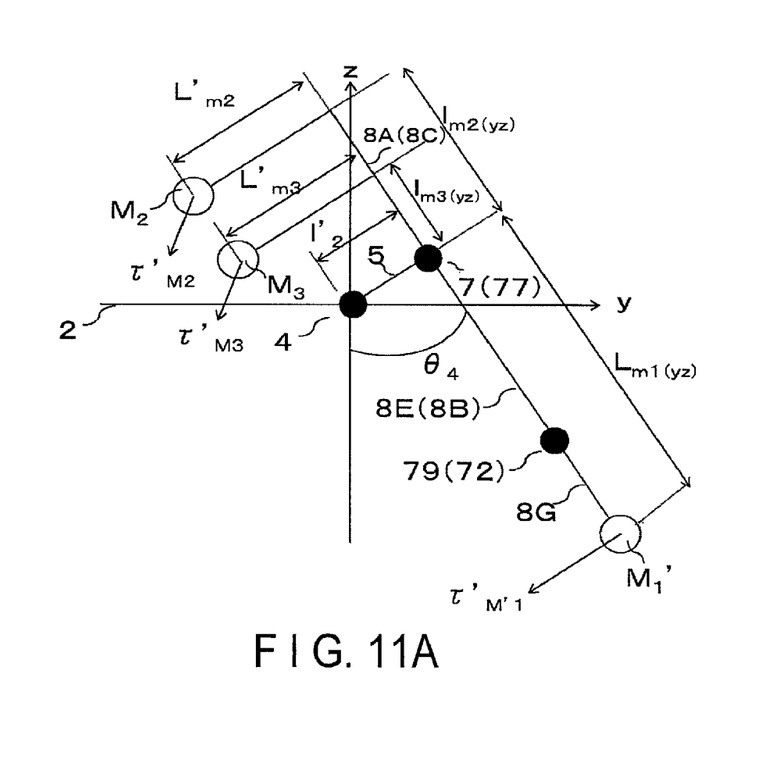
FIG. 11A is a model diagram which is seen from the first rotation axis.
Figure 11B:
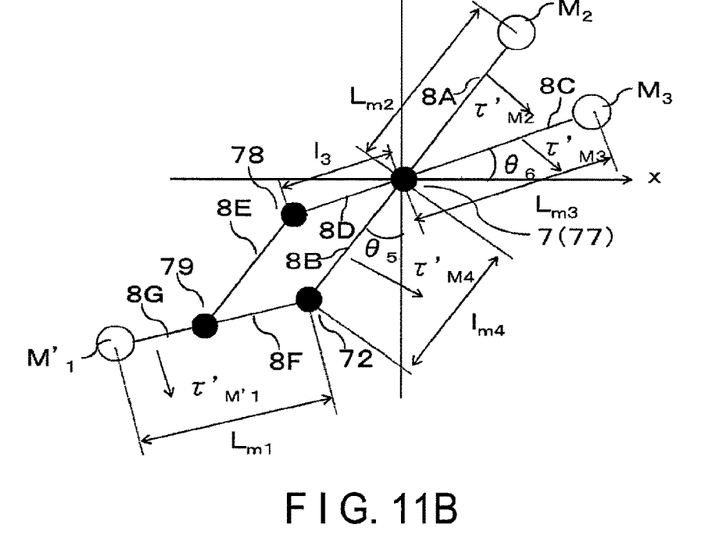
FIG. 11B is a model diagram which is seen from the second rotation axis.

FIG. 11A illustrates a model diagram of a manipulator which is seen from the direction of the first rotation axis 4 of the first joint 3. FIG. 11B illustrates a model diagram of a manipulator which is seen from the direction of the second rotation axis 7 of the second joint 6.

In FIG. 11A, the same portions as those of FIG. 10A are denoted with the same reference numerals, and explanation thereabout is omitted. In FIG. 11B, the same portions as those of FIG. 10B are denoted with the same reference numerals, and explanation thereabout is omitted.

A case where the holder 9 of the manipulator of FIG. 9 is holding an object will be considered.

In FIG. 11A, point M'$_1$ indicates a center of gravity of the fourth arm member 8G, the third joint 20, the holder 9, and the held object, and M'$_1$ is defined as a mass of the point M'$_1$. Let $L_{m1(yz)}$ be a length between the second rotation axis 7 and the point M'$_1$ projected on yz plane. Let $\theta_4$ be an angle between z axis and the second arm member 8B.

When the holder 9 is holding an object, the weight moving device 120a and the weight moving device 120b in the counterweight 10 are driven.

The first weight 125a of the weight moving device 120a in the counterweight part 10 connected to the first arm member 8A is moved in the second direction so as to increase the length between the first arm member 8A and the point $M_2$. At this occasion, the length between the first arm member 8A and the point $M_2$ of FIG. 11A is L'$_{m2}$, and the balance of the moments about the first rotation axis 4 can be maintained.

The first weight 125a of the weight moving device 120a in the counterweight part 10 connected to the third arm member 8C is moved in the second direction so as to increase the length between the first arm member 8C and the point $M_3$. At this occasion, the length between the first arm member 8C and the point $M_3$ is L'$_{m3}$.

Let $\tau'_{M'1}, \tau'_{M2}$, and $\tau'_{M3}$ be the moments caused by the point M'$_1$, the point $M_2$, and the point $M_3$ in FIG. 11A, respectively.

In FIG. 11B, let $L_{m1}$ be the length between the seventh rotation axis 72 and the point M'$_1$. Let $\theta_5$ be an angle between z axis and the second arm member 8B. Let $\theta_6$ be an angle between x axis and the third arm member 8C.

The second weight 125b of the weight moving device 120b in the counterweight part 10 connected to the first arm member 8A are moved in the third direction so as to increase the length between the second rotation axis 7 and the point $M_2$. At this occasion, the length between the second rotation axis 7 and the point $M_2$ of FIG. 11B is $L_{m2}$.

The second weight 125b of the weight moving device 120b in the counterweight part 10 connected to the first arm member 8C is moved in the third direction so as to increase the length between the second rotation axis 7 and the point $M_3$. At this occasion, the length between the second rotation axis 7 and the point $M_3$ of FIG. 11B is $L_{m3}$.

In FIG. 11B, let $\tau'_{M'1}$ be a moment of a portion of the length $l_{m1}$ between the seventh rotation axis 72 and the point M'$_1$. Let $\tau'_{M4}$ be a moment of a portion of the length $l_{m4}$ between the second rotation axis 7 and the seventh rotation axis 72. Let $\tau'_{M2}$ be a moment of a portion of the length $l_{m2}$ between the second rotation axis 7 and the point $M_2$. Let $\tau'_{M3}$ be a moment of a portion of the length $l_{m3}$ between the second rotation axis 7 and the point $M_3$.

When the holder 9 is holding an object, the weight moving device 120a and the weight moving device 120b in the counterweight 10 connected to the first arm member 8A and the weight moving device 120a and the weight moving device 120b in the counterweight 10 connected to the third arm member 8C are driven, so that the expressions (34)', (35)', and (36)' are satisfied. Just like the case where the holder 9 is not holding any object, the force for driving the first joint 3 and the second joint 6 can be suppressed. It is sufficient that the expressions (34)', (35)', and (36)' are approximately satisfied.

$$L_{m2}M_2 = _{m4}M'_1 \tag{34}'$$

$$L_{m3}M_3 = L_{m1}M'_1 \tag{35}'$$

$$(L'_{m2} - l'_2)M_2 + (L'_{m3} - l'_2)M_3 = l'_2 M'_1 \tag{36}'$$

Fourth Embodiment

Figure 12:
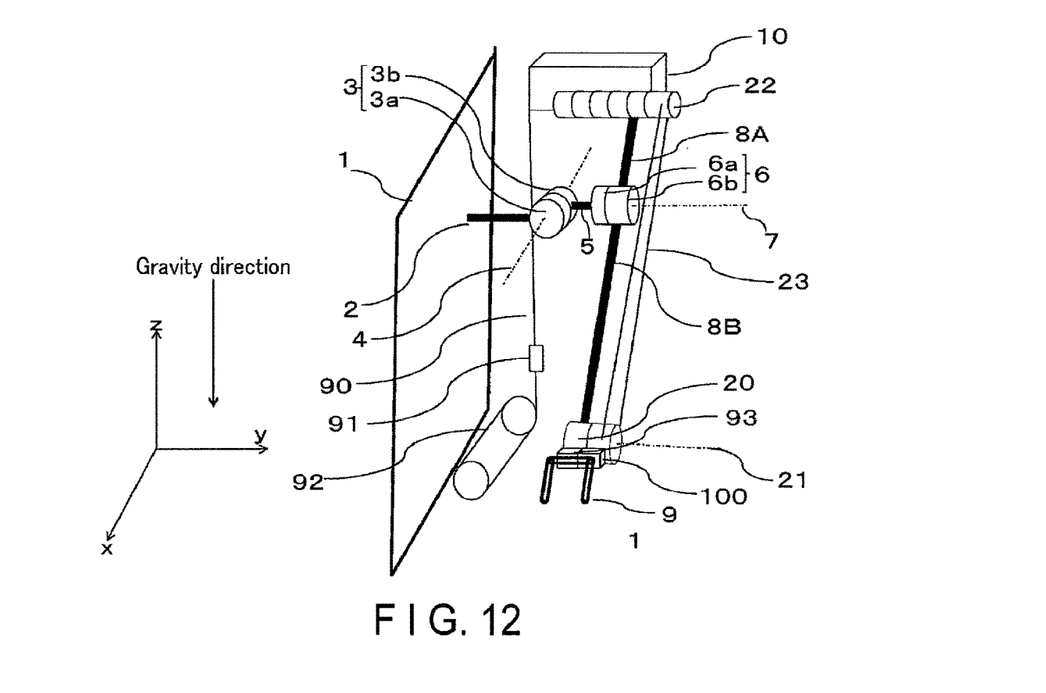
FIG. 12 is a schematic diagram illustrating a manipulator including a gravity compensation motor.

FIG. 12 illustrates a manipulator using a gravity compensation motor.

The manipulator of FIG. 12 includes a wire (also called a first wire) 90, a gravity compensation motor (also called a motor) 92, a tension sensor (also called a first sensor) 91, a hold detector (also called a second sensor) 93, and a force sensor (also called a third sensor) 100 in addition to the components of the manipulator of FIG. 5. The same portions as those of FIG. 5 are denoted with the same reference numerals, and explanation thereabout is omitted.

One end of the wire 90 is connected to the counterweight part 10. The other end of the wire 90 is connected to a gravity compensation motor 92.

The gravity compensation motor 92 is connected and fixed to the body 1 of the robot. A tension sensor 91 is provided in the wire 90 between the gravity compensation motor 92 and the counterweight part 10.

The tension sensor 91 detects a tension (first tension) applied to the wire 90.

The hold detector 93 and the force sensor 100 are provided at the holder 9. The hold detector 93 can detect whether the holder 9 has held an object or not. The force sensor 100 detects the mass of the held object and the position of the center of gravity of the holder 9 being holding the object.

When the holder 9 is holding an object, a tension is applied to the wire 90. This tension is detected by the tension sensor 91. The weight compensation motor 92 further applies a tension to the wire 90 based on a tension detected by the tension sensor 91, and pulls the counterweight part 10.

When the holder 9 of the manipulator of FIG. 12 is holding an object, a moment $\tau'_{m1}$ is generated as illustrated in FIG. 4A and FIG. 4B. When the holder 9 is holding an object, the gravity compensation motor 92 pulls the counterweight part 10 via the wire 90 so as to generate a moment $\tau'_{m2}$ as illustrated in FIG. 4A and FIG. 4B.

The moment $\tau'_{m2}$ about the first rotation axis 4 of the first joint 3 is exerted in a direction opposite to the moment $\tau'_{m1}$, and the moment $\tau'_{m2}$ about the second rotation axis 7 of the second joint 6 is exerted in a direction opposite to the moment $\tau'_{m1}$, and therefore, the force for driving the first joint 3 and the second joint 6 is suppressed. Therefore, a less torque is required for the actuator to drive the first joint 3 and the second joint 6, and the size of the actuator itself can be reduced.

Fifth Embodiment

Figure 13:
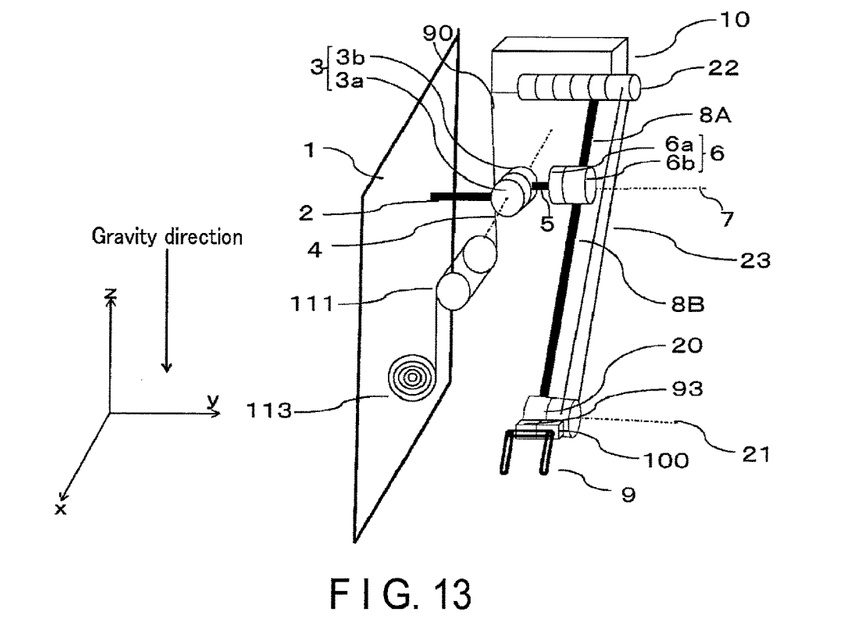
FIG. 13 is a schematic diagram illustrating a manipulator including a constant force spring and a gearbox.

FIG. 13 illustrates a manipulator using a gearbox 111 and a constant force spring (also called a spring) 113.

The manipulator of FIG. 13 includes a gearbox 111 for pulling a counterweight part 10 via a wire 90 and a constant force spring 113 connected to the gearbox 111 via the wire 90, in addition to the components of the manipulator of FIG. 12. The same portions as those of FIG. 12 are denoted with the same reference numerals, and explanation thereabout is omitted.

One end of the wire 90 is connected to the counterweight part 10, and the other end of the wire 90 is connected to the constant force spring 113.

The gearbox 111 for pulling the wire 90 is connected to the wire 90 between the counterweight part 10 and the constant force spring 113.

The constant force spring 113 applies a substantially constant tension at all times to the wire 90 between the constant force spring 113 and the gearbox 111.

The gearbox 111 pulls the counterweight part 10 via the wire 90. The gearbox 111 includes a motor. When the gear provided in the gearbox 111 is changed, the transmission gear ratio of the gearbox 111 is changed, so that the speed for pulling the wire 90 can be changed. When the speed for pulling the wire 90 is changed by changing the gear of the gearbox 111, the tension of the wire 90 is changed. For example, when the gear of the gearbox 111 is changed, and the speed for pulling the wire 90 is doubled, the tension applied to the wire 90 is reduced to half.

The constant force spring 113 pulls the counterweight part 10 via the wire 90, so that, even in a case where the holder 9 holds an object, the gravity compensation can be performed about the first rotation axis 4 of the first joint 3 and the second rotation axis 7 of the second joint 6.

When the holder 9 of the manipulator of FIG. 13 is holding an object, a moment $\tau'_{m1}$ as illustrated in FIG. 4A and FIG. 4B is generated. When the holder 9 is holding an object, the gravity compensation motor 92 pulls the counterweight part 10 via the wire 90 so as to generate a moment $\tau'_{m2}$ as illustrated in FIG. 4A and FIG. 4B.

The moment $\tau'_{m2}$ is exerted in a direction opposite to the moment $\tau'_{m1}$ about the first rotation axis 4 of the first joint 3, and the moment $\tau'_{m2}$ is exerted in a direction opposite to the moment $\tau'_{m1}$ about the second rotation axis 7 of the second joint 6, and therefore, the force for driving the first joint 3 and the second joint 6 can be suppressed.

Therefore, a less torque is required for the actuator to drive the first joint 3 and the second joint 6, and the actuator itself can be reduced in size.

Figure 14:
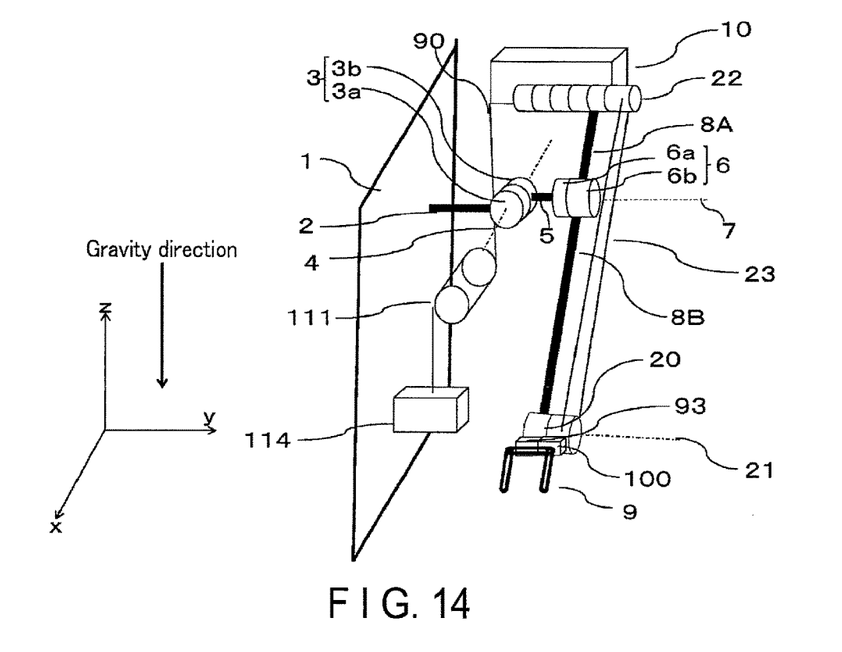
FIG. 14 is a schematic diagram illustrating a manipulator including a counterweight and a gearbox.

FIG. 14 illustrates a manipulator using the gearbox 111 and the counterweight part 114.

The manipulator of FIG. 14 has the configuration similar to that illustrated in FIG. 13, and the constant force spring 113 of FIG. 13 is replaced with a counterweight part (also called a third weight) 114. The same portions as those of FIG. 13 are denoted with the same reference numerals, and explanation thereabout is omitted.

One end of the wire 90 is connected to the counterweight part 10, and the other end of the wire 90 is connected to the counterweight part 114.

The gearbox 111 pulling the wire 90 is connected to the wire 90 between the counterweight part 10 and the counterweight part 114. The counterweight part 114 applies a substantially constant tension at all times to the wire 90 between the counterweight part 114 and the gearbox 111.

The manipulator of FIG. 14 uses the counterweight part 114, so that the consumed energy can be suppressed without using the gravity compensation motor 92 as illustrated in FIG. 12. As the counterweight part 114 which is a weight, a battery or the like of the robot may be used.

Figure 15:
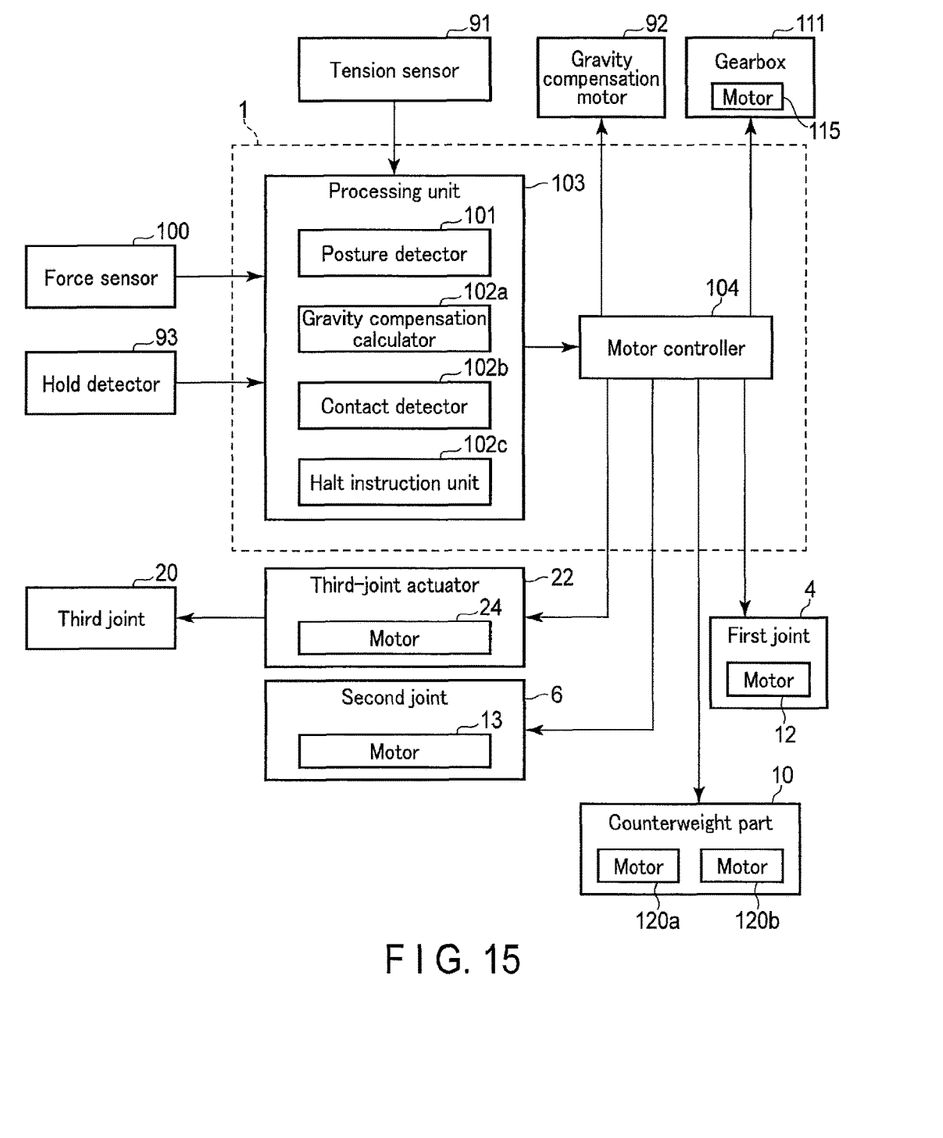
FIG. 15 is a block diagram illustrating a processing unit and a controller for the manipulator.

FIG. 15 illustrates the processing unit 103 and the motor controller (also called a controller) 104 for the manipulator.

The processing unit 103 and the motor controller 104 are provided in the base 1 of FIG. 7. The processing unit 103 and the motor controller 104 may be implemented in a single control device (circuit).

The processing unit 103 includes a posture detector 101 detecting the angles of the joints of the first joint 3, the second joint 6, and the third joint 20, a gravity compensation calculator 102a for calculating the force of the gravity compensation motor 92, a contact detector 102b for detecting the force of the gravity compensation motor 92 and the force detected by the tension sensor 91, and a halt instruction unit 102c for giving a halt command to the motor controller 104.

Based on a command from the processing unit 103, the motor controller 104 controls a motor 12 of the first joint 3, a motor 13 of the second joint 6, the motor 24 of the third-joint actuator 22, the gravity compensation motor 92, motors 120a, 120b inside of the counterweight part 10, and a motor 115 of the gearbox 111.

The posture detector 101 detects the angles of the joints of the first joint 3, the second joint 6, and the third joint 20.

A case where the manipulator having the weight compensation motor of FIG. 12 lifts an object will be considered.

When the holder 9 holds an object, a tension is applied to the wire 90. In this case, the tension sensor 91 detects a tension (first tension) of the wire 90 connecting the gravity compensation motor 92 and the counterweight part 10. Based on information detected by the force sensor 100, the posture detector 101, and the hold detector 93, the gravity compensation calculator 102a of the processing unit 103 predicts a tension (second tension) of the wire 90 applied so that the holder 9 lifts the held object to a target position. The contact detector 102b of the processing unit 103 compares the tension detected by the tension sensor 91 with the tension of the wire 90 predicted and calculated by the gravity compensation calculator 102a.

When the tension detected by the tension sensor 91 is within a range of ±20% of the tension of the wire 90 predicted and calculated by the gravity compensation calculator 102a, the motor controller 104 controls the motor 12 of the first joint 4, the motor 13 of the second joint 6, the motor 24 of the third-joint actuator 22, the gravity compensation motor 92, and the motor 115 of the gearbox 111, so that the holder 9 raises the held object to a target position.

When the tension detected by the tension sensor 91 is out of the range of ±20% of the tension of the wire 90 predicted and calculated by the gravity compensation calculator 102a, the processing unit 103 assumes that the arm is in contact with an object other than the held object.

The halt instruction unit 102c of the processing unit 103 gives a command to the motor controller 104 to stop the motor 12 of the first joint 4, the motor 13 of the second joint 6, the motor 24 of the third-joint actuator 22, the gravity compensation motor 92, and the motor 115 of the gearbox 111.

A contact with an object other than the held object can be detected without providing a contact sensor around the manipulator, and therefore, this can produce a compact and safe manipulator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manipulator comprising:
a base;
a first joint having a rotation axis in a first direction crossing a gravity direction;
a first coupling member coupling the base and the first joint;
a second joint having a rotation axis in a second direction crossing the first direction;
a second coupling member coupling the first joint and the second joint;
a first arm coupled with the second joint along a third direction crossing the second direction;
a second arm coupled with the second joint, at a side opposite to a side where the second joint is coupled with the first arm, along the third direction;
a variable center-of-gravity unit coupled with the first arm at a side opposite to a side where the first arm is coupled with the second joint, the variable center-of-gravity unit including a first weight and a second weight;
a holder coupled with the second arm at a side opposite to a side where the second arm is coupled with the second joint; and
a controller which controls the variable center-of-gravity unit to perform at least one of operations while the holder holds an object, the operations including a first operation for moving the first weight of the variable center-of-gravity unit in a direction crossing the rotation axis of the first joint and a second operation for moving the second weight of the variable center-of-gravity unit in a direction crossing the rotation axis of the second joint.

2. The manipulator according to claim 1, further comprising:
a first wire including a first end and a second end, the first end being connected to the variable center-of-gravity unit;
a motor connected to the second end of the first wire;
a first sensor which is provided at the first wire and which detects a first tension applied to the first wire;
a second sensor which is provided at the holder and which detects whether or not the holder is holding an object; and
a third sensor which is provided at the holder and which detects a position of a center of gravity of the holder when the holder is holding an object, and a mass of the object held by holder.

3. The manipulator according to claim 1, further comprising:
a first wire including a first end and a second end, the first end being connected to the variable center-of-gravity unit;
a spring connected to the second end of the first wire; and
a gearbox which is connected to the first wire and which changes a speed for pulling the first wire by changing gear.

4. The manipulator according to claim 1, further comprising:
- a first wire including a first end and a second end, the first end being connected to the variable center-of-gravity unit;
- a third weight connected to the second end of the first wire; and
- a gearbox which is connected to the first wire and which changes a speed for pulling the first wire by changing gear.

5. The manipulator according to claim 2, wherein the controller calculates, based on information detected by the second sensor and the third sensor, a second tension of the first wire applied when the holder raises the held object, compares the second tension with the first tension, and operates the motor based on a comparison result.

\* \* \* \* \*